US010163351B2

(12) United States Patent
Lei et al.

(10) Patent No.: US 10,163,351 B2
(45) Date of Patent: Dec. 25, 2018

(54) ENHANCED LANE DETECTION

(71) Applicant: Ford Global Technologies, LLC, Dearborn, MI (US)

(72) Inventors: Oliver Lei, Windsor (CA); Allen R. Murray, Lake Orion, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 12 days.

(21) Appl. No.: 15/248,508

(22) Filed: Aug. 26, 2016

(65) Prior Publication Data

US 2018/0061238 A1 Mar. 1, 2018

(51) Int. Cl.
*G05D 1/02* (2006.01)
*G08G 1/16* (2006.01)
*E01F 9/529* (2016.01)

(52) U.S. Cl.
CPC ............. *G08G 1/167* (2013.01); *E01F 9/529* (2016.02); *G05D 1/028* (2013.01); *G05D 1/0255* (2013.01); *G08G 1/162* (2013.01)

(58) Field of Classification Search
CPC ....... G08G 1/167; G05D 1/0255; G05D 1/028
See application file for complete search history.

(56) References Cited

U.S. PATENT DOCUMENTS

2009/0115638 A1* 5/2009 Shankwitz ............ G01C 21/26 340/988
2011/0128902 A1 6/2011 Guo
2012/0098657 A1 4/2012 Bogatine
2013/0154853 A1* 6/2013 Chen ................ G08G 1/096716 340/905
2014/0249718 A1 9/2014 Liu et al.
2015/0010212 A1* 1/2015 Segarra .............. G08G 1/09626 382/104
2016/0078760 A1* 3/2016 Crickmore ............... G08G 1/04 701/117
2016/0132705 A1 5/2016 Kovarik et al.
(Continued)

FOREIGN PATENT DOCUMENTS

CN 203535663 U 4/2014
EP 2807641 A1 12/2014
(Continued)

OTHER PUBLICATIONS

"Rumble Strip Noise Study", Technical Report prepared for Minnesota Department of Transportation, State Project No. 8816-2027; May 2014 (94 pages).
(Continued)

*Primary Examiner* — Aaron L Troost
(74) *Attorney, Agent, or Firm* — Frank A. MacKenzie; Bejin Bieneman PLC

(57) ABSTRACT

A roadway lane of a host vehicle is determined based on a sound from an impact between a tire of the host vehicle and a set of protrusions in a roadway. A communication is received from a target vehicle. The communication identifies a roadway lane of the target vehicle. The roadway lane of the host vehicle is compared to the roadway lane of the target vehicle. A vehicle subsystem is controlled in accordance with the communication based at least in part on whether the roadway lane of the host vehicle is the same as the roadway lane of the target vehicle.

19 Claims, 8 Drawing Sheets

(56) References Cited

U.S. PATENT DOCUMENTS

| | | | | |
|---|---|---|---|---|
| 2017/0025017 | A1* | 1/2017 | Thomas ............. | G06K 9/00798 |
| 2018/0061236 | A1* | 3/2018 | Yamamoto ............. | G08G 1/162 |

FOREIGN PATENT DOCUMENTS

| | | | |
|---|---|---|---|
| GB | 2513399 | A | 10/2014 |
| JP | H0962980 | A | 3/1997 |
| WO | WO 2006088916 | A2 | 8/2006 |
| WO | 2008051144 | A1 | 5/2008 |
| WO | WO 2012047708 | A1 | 4/2012 |
| WO | 2013112057 | A1 | 8/2013 |

OTHER PUBLICATIONS

GB Search Report dated Feb. 20, 2018 re GB Appl. No. 1713417.2.

* cited by examiner

ENHANCED LANE DETECTION

BACKGROUND

Collision avoidance systems generate a warning indicating a probability of a collision between two vehicles. The warnings include a forward collision warning, a lane departure warning, a blind spot warning, and a do not pass warning. Some collision avoidance systems apply a brake to prevent the collision.

DETAILED DESCRIPTION

Vehicles with collision avoidance systems receive communications from nearby target vehicles. Processing those communications consumes resources of the vehicle computer. However, not all of the received communications are relevant to every vehicle, particularly when the communication is from a target vehicle in a different lane than that of the vehicle that receives the communication. For example, collision warnings that would otherwise trigger a forward collision warning indicating that a vehicle is about to collide with the target vehicle are less relevant to vehicles in adjacent lanes because the potential for collision with the target vehicle does not exist so long as the vehicles remain in separate lanes. Vehicle computing resources can be preserved by ignoring less relevant communications from other vehicles.

One way to preserve vehicle computing resources, therefore, includes a lane detection system that determines a roadway lane of a host vehicle and processes communications according to the relevance of the communication to vehicles in the lane of the host vehicle. Specifically, the system determines the roadway lane of the host vehicle based on a sound from an impact between a tire of the host vehicle and a set of protrusions in a roadway. Because the communication from the target vehicle identifies its own roadway lane, the system of the host vehicle can compare the roadway lane of the host vehicle to the roadway lane of the target vehicle and use the lane comparison to determine how to treat the communication.

For instance, the system incorporated into the host vehicle can control a vehicle subsystem in accordance with the communication from the target vehicle if the host vehicle and the target vehicle are in the same roadway lane and ignore the communication if the host vehicle and the target vehicle are in different roadway lanes. Using the roadway lanes of the host vehicle and the target vehicle, the lane detection system filters communications from target vehicles in different roadway lanes than the roadway lane of the host vehicle and follows communications from target vehicles in the same roadway lane as the host vehicle. Thus, the lane detection system can selectively actuate a vehicle subsystem, such as steering, throttle, or braking, to avoid potential collisions with the target vehicle when the host vehicle and target vehicle are in the same lane and ignore the communication when the host vehicle is not likely to collide with the target vehicle or when the communication from the target vehicle is otherwise deemed less relevant given that it originated from a target vehicle in a different roadway lane.

Figure 1:
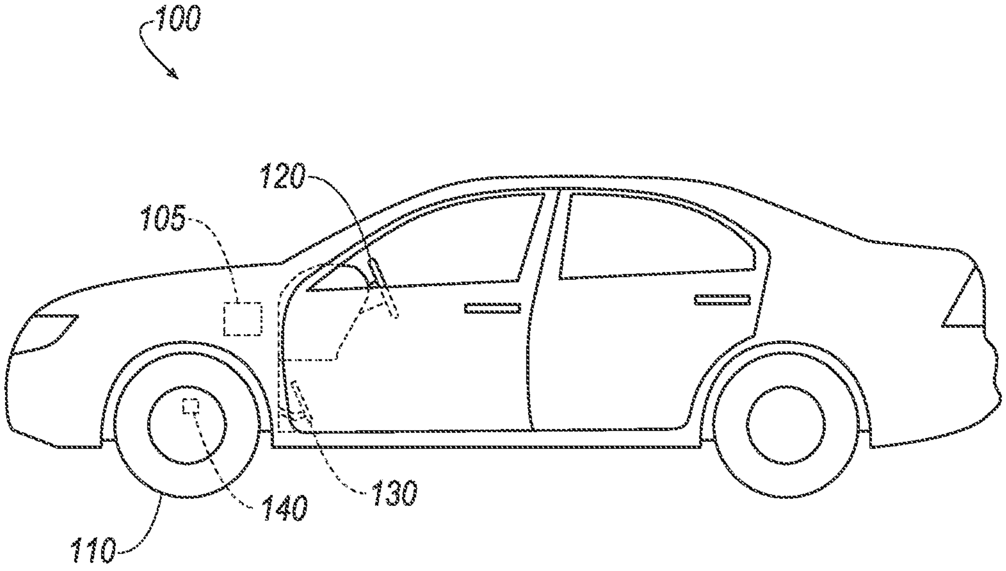
FIG. 1 illustrates an example host vehicle including a lane detection system.

FIG. 1 illustrates a host vehicle 100 including a lane detection system 105. The system 105 determines the roadway lane of the host vehicle and adjusts vehicle subsystems based on the roadway lane of the host vehicle 100. Although shown as a car, the host vehicle 100 may include any passenger or commercial automobile such as a car, a truck, a sport utility vehicle, a crossover vehicle, a van, a minivan, a taxi, a bus, etc. In some possible approaches, as discussed below, the host vehicle 100 is an autonomous vehicle that can operate in various autonomous (e.g., driverless) modes.

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention. The host vehicle 100 may operate in one or more of the levels of autonomous vehicle operation. As used herein, non-autonomous modes of operation may refer to levels 0-1, partially autonomous modes of operation may refer to levels 2-3, and fully autonomous modes of operation may refer to levels 4-5.

The host vehicle 100 includes multiple wheel assemblies, each having a tire 110 that contacts the roadway to move the host vehicle 100 along the roadway. The rotation of the tire 110 may be driven by a powertrain subsystem. The tire 110 may be constructed of, e.g., rubber. The tire 110 may impact a set of protrusions in the roadway to produce a sound, as described below and shown in FIG. 3.

The host vehicle 100 includes a steering wheel 120, an accelerator pedal 130, and a brake 140. The steering wheel 120 may be attached to a steering column and rotatably engaged with steering rack to steer the tire 110 to steer the host vehicle 100. Thus, rotation of the steering wheel 120 is transferred via the steering column to the steering rack, which then steers the tire 110 to an angle relative to a body of the host vehicle 100 to steer the host vehicle 100. The driver uses the steering wheel 120 to turn the host vehicle 100, e.g., into a different lane, such as an adjacent roadway lane or onto a lane of a different roadway. Pressing the accelerator pedal 130 actuates a propulsion subsystem, e.g., a throttle, an electric motor, etc., to propel the host vehicle 100. Pressing the brake 140 slows and ultimately stops the host vehicle 100 through friction by causing brake pads to engage rotors included in the wheel assembly. The friction opposes rotation of the tire 110.

Figure 2:
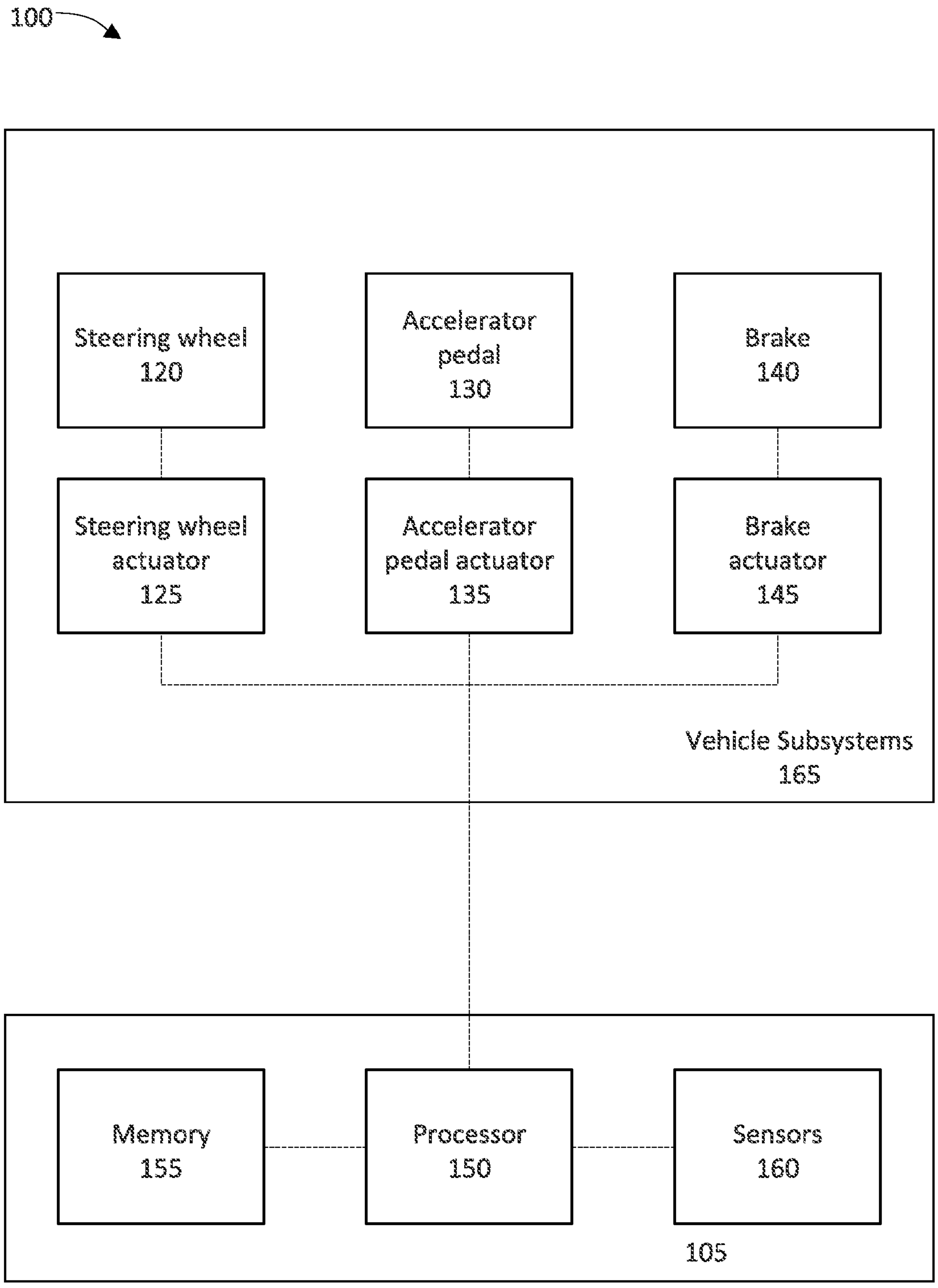
FIG. 2 is a block diagram of the lane detection system.

FIG. 2 is a block diagram showing example components of the host vehicle 100 including components of the system 105. The system 105 includes a processor 150, a memory 155, and at least one sensor 160.

Sensors 160, which are implemented via circuits, chips, or other electronic components, include a variety of devices, e.g., a steering wheel angle sensor, a pedal position sensor, a microphone, etc. The sensors 160 can output data to the processor 150 via a vehicle network or bus. The data output to the processor 150 may include, e.g., data relating to vehicle speed, acceleration, position, system and/or component status, etc. Alternatively, the sensors 160 can output data to a controller, e.g., an autonomous mode controller. Other sensors 160 could include cameras, motion detectors, etc., i.e., sensors 160 to provide data for evaluating the location of the target vehicle, projecting a path of the target vehicle, etc. The processor 150 can instruct the sensors 160 to collect data on specific objects, e.g., the target vehicles.

One of the sensors 160 may be a microphone 160. The microphone 160 is a transducer configured to receive acoustic vibrations, i.e., sounds, and convert the sounds into an electrical signal. The microphone 160 may receive the sounds, generate a signal representing the sound received, and output the signal to the processor 150. As described further below, the processor 150 may identify a roadway lane based on the sound received by the microphone 160.

The processor 150 is implemented via circuits, chips, or other electronic component that can receive the data from the sensors 160 and determine, from the data, the roadway lane of the host vehicle 100. The processor 150 may be programmed to process the sensor 160 data. Processing the data may include processing the video feed or other data stream captured by the sensors 160 to determine the roadway lane of the host vehicle 100 and the presence of any target vehicles. As described below, the processor 150 instructs vehicle components to actuate in accordance with the sensor data. The processor 150 may be incorporated into a controller, e.g., an autonomous mode controller. The memory 155 is implemented via circuits, chips, or other electronic components that can electronically store data, including instructions executable by the processor 150. Thus, the memory 155 may be implemented via a hard disk drives, solid state drives, servers, or any volatile or non-volatile media. The memory 155 may store data collected from the sensors 160.

The processor 150 communicates with at least one vehicle subsystem 165. The vehicle subsystems 165 control components of the host vehicle 100. The processor 150 instructs the vehicle subsystems 165 to actuate particular vehicle components to adjust operation of the host vehicle 100. The vehicle subsystems 165 may include, e.g., a steering subsystem, a brake subsystem, a navigation subsystem, a powertrain, etc.

The processor may actuate the subsystems 165 to control the host vehicle components, e.g., to stop the host vehicle 100, to move the host vehicle 100 to an adjacent roadway lane, to avoid target vehicles, etc. For example, as shown in FIG. 2, a steering subsystem includes the steering wheel 120 and a steering wheel actuator 125. The processor 150 can actuate the steering wheel actuator 125 to move the steering wheel 120 to a steering angle. That is, the processor 150 may output a control signal including a predetermined steering angle to the steering wheel actuator 125, which in turn causes the steering wheel 120 to move to the predetermined steering angle, which rotates the steering column and moves the steering rack, causing the tire 110 to steer to an angle relative to the body of the host vehicle 100 to turn the host vehicle 100. Thus, the processor 150 can control the steering of the host vehicle 100 with the steering subsystem. For example, the processor 150 may receive a communication indicating a target vehicle in the same roadway lane as the host vehicle 100 and actuate the steering wheel actuator 125 to rotate the steering wheel 120 in a clockwise or counter-clockwise direction, which could result in the host vehicle 100 changing lanes, turning onto a different roadway, exiting a freeway, etc. An accelerator subsystem includes the accelerator pedal 130 and an accelerator pedal actuator 135. The processor 150 can output a control signal to the accelerator pedal actuator 135 including a predetermined accelerator pedal angle to move the accelerator pedal 130 to the predetermined accelerator pedal angle, which actuates the vehicle 100 propulsion by, e.g., opening a throttle to introduce air to an internal combustion engine, actuating an electric motor, etc. That is, the processor 150 can control the propulsion of the host vehicle 100 with the accelerator subsystem by changing the position of the accelerator pedal 130 via the accelerator pedal actuator 135. A brake subsystem includes the brake 140 and a brake actuator 145. The processor 150 can output a control signal the brake actuator 145, which in turn causes the brake 140 to apply friction to slow rotation of the tire 110 to slow or stop the host vehicle 100. Furthermore, the processor 150 may actuate the brake subsystem according to the time necessary to stop the host vehicle 100 before colliding with the target vehicle. For example, the processor 150 may determine that, to prevent the host vehicle 100 from colliding with the target vehicle, the processor 150 may instruct the brake actuator 145 to abruptly actuate the brake 140. That is, the processor 150 may instruct the brake actuator 145 to apply the brake 140 to a specific brake angle according to how abruptly the processor 150 determines to prevent the host vehicle 100 from colliding with the target vehicle. The processor 150 may output signals to control any number of vehicle subsystems 165, including the steering subsystem, the accelerator subsystem, and the brake subsystem, to move the host vehicle 100 according to the communication.

Figure 3:
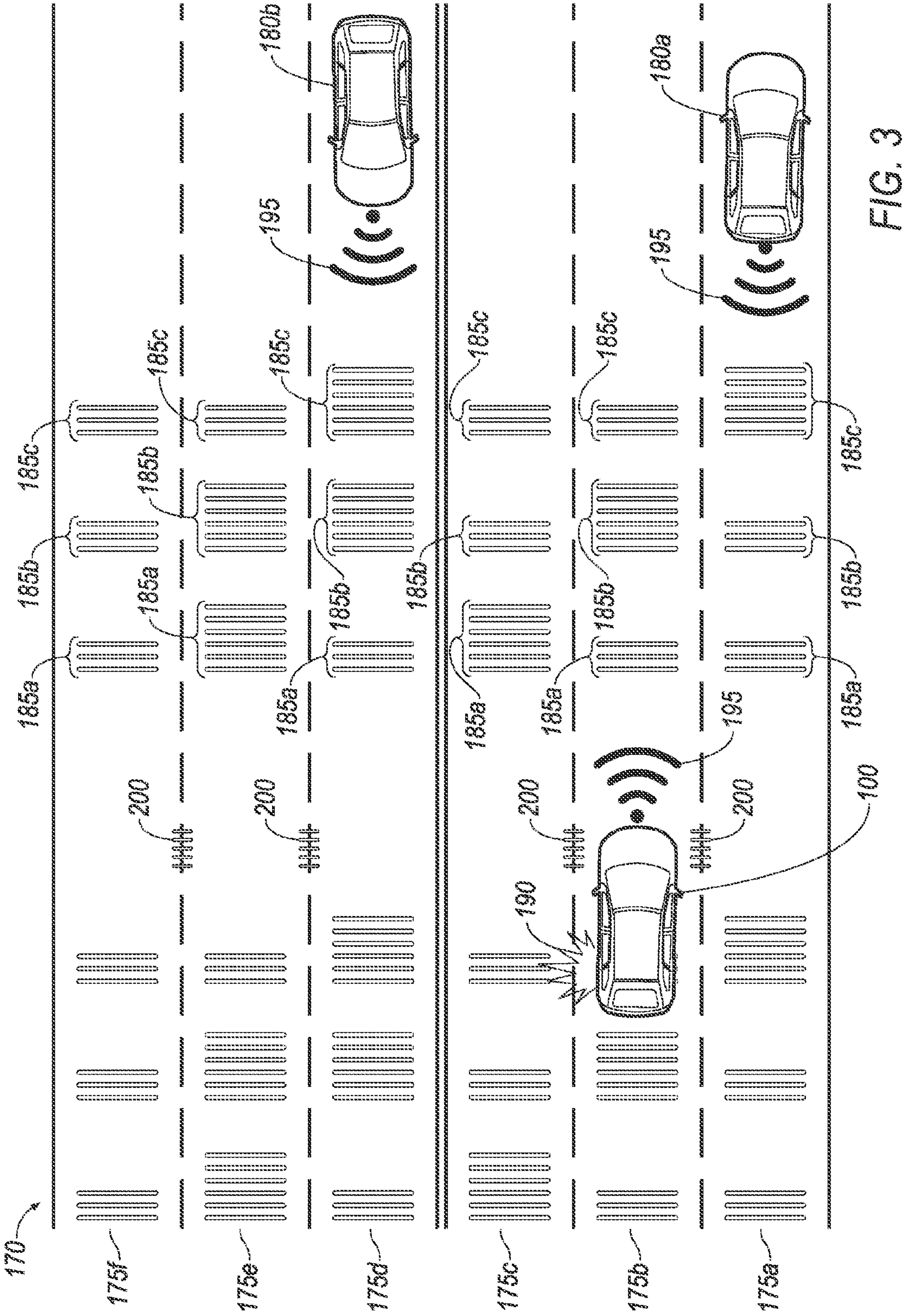
FIG. 3 is an example scenario where the host vehicle of FIG. 1 receives communications from a plurality of target vehicles in various lanes.

The processor 150 may be programmed to recognize a sound received by one of the sensors 160 (e.g., the microphone) and identify a roadway lane of the host vehicle 100 based on the sound. As shown in FIG. 3, the roadway may include a set of protrusions that impact the tire 110, generating a sound. Based on the number of protrusions and the spacing between the protrusions in the set of protrusions, the sound may differ from the sound generated by other sets of protrusions in the roadway. The processor 150 may be programmed to identify the roadway lane based on the sound, i.e., the set of protrusions in one of the roadway lanes generates the same sound throughout the roadway lane, and the processor 150 may be programmed to, upon receiving the sound, identify the roadway lane.

The processor 150 may be programmed to control various vehicle subsystems 165 according to the number of target vehicles detected, the roadway lanes of each of the target vehicles, the roadway lane of the host vehicle 100, and the communications received from the target vehicles. For example, if the processor 150 receives a communication from a target vehicle in a roadway lane that is the same as the roadway lane of the host vehicle 100, the processor 150 may be programmed to actuate one or more of the vehicle subsystems 165 to slow or stop the host vehicle if the communication includes a warning. In another example, the processor 150 may be programmed to perform a lane change, i.e., move the host vehicle 100 to an adjacent roadway lane, based on the communication.

The processor 150 may be programmed to ignore some communications sent by target vehicles. The communication may identify a roadway lane of the target vehicle, a direction of travel of the target vehicle, and a specific warning. However, certain warnings may not be applicable to the host vehicle 100 if the host vehicle 100 is in a different roadway lane or is moving in an opposing direction of travel of the target vehicle. For example, if the communication from the target vehicle would otherwise trigger a forward collision warning in the host vehicle 100, the processor 150 may be programmed to ignore the communication if the roadway lane of the host vehicle 100 is different than the roadway lane of the target vehicle or if the direction of travel of the host vehicle 100 is different from the direction of travel of the target vehicle. The processor 150 is thus programmed to operate according to the communication if the roadway lane of the host vehicle 100 is the same as the roadway lane of the target vehicle. Thus, the host vehicle 100 may selectively ignore communications based on warnings that present little to no likelihood of a collision between the host vehicle 100 and the target vehicle.

FIG. 3 illustrates a roadway 170 including a plurality of roadway lanes 175 and a plurality of target vehicles 180. The example roadway 170 of FIG. 3 has six roadway lanes 175, three roadway lanes 175 in a first direction of traffic and three roadway lanes 175 in an opposing direction of traffic. The roadway 170 may have a different number of roadway lanes 175, e.g., two roadway lanes 175, three roadway lanes 175, eight roadway lanes 175, etc. FIG. 3 further illustrates two target vehicles 180*a*, 180*b*.

The roadway 170 includes a plurality of protrusions 185. The protrusions 185 are portions of the roadway 170 elevated above the rest of the roadway 170, e.g., solid strips of a rigid material. The protrusions 185 may be attached to the roadway 170 or integrally formed with the roadway 170. An impact between the vehicle tire 110 and the protrusions 185 produces a sound 190, and the microphone 160 receives the sound 190. The processor 150 is programmed to determine the roadway lane 175 of the host vehicle 100 based on the sound 190, or combinations of sounds, received by the microphone 160. As shown in FIG. 3, each roadway lane 175 has a set of protrusions 185. The protrusions 185 of FIG. 3 are divided into three subsets 185*a*, 185*b*, 185*c*. Each subset of protrusions 185 may include a different number of protrusions 185 such that each set of protrusions 185, collectively, produces a different sound from the other sets of protrusions 185. As used herein, a “different” sound 190 is a sound 190 that has a different length, amplitude, pattern, and/or frequency than another sound 190. In the example of FIG. 3, each set of protrusions 185 produces a sound 190 having a different pattern than the sound 190 produced by another set of protrusions 185. The roadway lane 175*b* of the host vehicle 100 has three protrusions 185 in a first subset 185*a*, six protrusions 185 in a second subset 185*b*, and three protrusions 185 in a third subset 185*c*.

The tire 110 may impact the protrusions 185, generating a vibration that produces a sound 190. The sound 190 is composed of three portions, each portion corresponding to the impact between the tire 110 and one of the subsets 185*a*, 185*b*, 185*c* in the set of protrusions 185. A length of the portion is determined based on the number of protrusions 185 in the subset 185*a*, 185*b*, 185*c* that the tire 110 impacts. Based on the lengths of the portions, the processor 150 may be programmed to identify the roadway lane 175.

For example, the roadway lane 175*b* of the host vehicle 100 has 3 protrusions 185 in the first subset 185*a*, 6 protrusions 185 in the second subset 185*b*, and 3 protrusions 185 in the third subset 185*c*. Thus, the portion of the sound 190 generated by the second subset 185*b* is twice as long as the lengths of the portions of the sound 190 for the first and third subsets 185*a*, 185*b*, i.e., the ratio of the length of the portion of the subset 185*b* to the length of either one of the portions of the subsets 185*a*, 185*c* is 2:1. That is, the tire 110 impacts 6 protrusions 185 in the second subset 185*b*, generating a longer portion than the first and third subsets 185*a*, 185*c* where the tire 110 impacts 3 protrusions 185, giving a ratio of 6:3, or 2:1. Based on the number of protrusions 185 for each subset 185*a*, 185*b*, 185*c*, the ratio of the length of the longer portions (e.g., the subset 185*b*) to the shorter portions (e.g., the subsets 185*a*, 185*c*) may be different than 2:1, e.g., 3:1, 5:2, etc., and a larger ratio (e.g., 2:1 or greater) may be better for determining the length of the subsets 185*a*, 185*b*, 185*c*. The processor 150 may be programmed to recognize the length of the portions and assign a binary value to each portion based on the length. When the portion of the sound 190 is generated a subset with 3 protrusions 185, i.e., a short portion, the processor 150 may be programmed to assign a value of 0 to the portion. When the portion of the sound 190 is generated by a subset with 6 protrusions 185, i.e., a long portion, the processor 150 may be programmed to assign a value of 1 to the portion. The processor 150 may be programmed to measure the length of each portion and assign the corresponding value to the portion. Thus, based on the length of the subsets 185*a*, 185*b*, 185*c*, a three-digit binary value can be assigned to each set of protrusions 185. For example, the value assigned to the roadway lane 175*b* of the host vehicle 100 is 0-1-0, indicating a short portion followed by a long portion followed by another short portion. In another example, the roadway lane 175*a* of one of the target vehicles 180*a* may have a value of 0-0-1, indicating that the roadway lane 175*a* of the target vehicle 180*a* differs from the roadway lane 175*b* of the host vehicle 100. That is, the sound 190 from the impact between the tire 110 of the host vehicle 100 and the set of protrusions 185 in the roadway lane 175*a* of the host vehicle 100 may be different from a sound 190 from an impact between a tire 110 of the target vehicle 180 and a set of protrusions 185 in the roadway lane 175*b* of the target vehicle 180.

Each of the roadway lanes 175 may have a different three-digit binary value based on the set of protrusions 185 in the roadway lane 175. FIG. 3 shows six roadway lanes 175*a*, 175*b*, 175*c*, 175*d*, 175*e*, 175*f*, each with a different set of protrusions 185 indicating a unique binary code. For example, from the perspective of the host vehicle 100, for roadway lanes 175 moving in the direction of traffic of the host vehicle 100, the right roadway lane 175*a* has a code of 0-0-1, the middle roadway lane 175*b* has a code of 0-1-0, and the left roadway lane 175*c* has a code of 1-0-0. In the direction of traffic opposite the host vehicle 100, the right roadway lane 175*f* has a code of 0-0-0, the middle roadway lane 175*e* has a code of 0-1-1, and the left roadway lane 175*d* has a code of 1-1-0. As shown in FIG. 3, the set of protrusions 185 in the roadway lane 175*b* of the host vehicle 100 includes a different number of protrusions 185 than the set of protrusions 185 in the roadway lane 175*d* of the target vehicle 180*b*. Furthermore, the set of protrusion 185 in the roadway lane 175*b* of the host vehicle 100 includes the same number of protrusions 185 as the set of protrusions in the roadway lane 175*a* of the target vehicle 180*a*, but the subsets 185*b*, 185*c* of the roadway lane 175*a* each have a different number of protrusions 185 than the subsets 185*b*, 185*c* of the roadway lane 175*b*.

The processor 150 may be programmed to recognize the code of each roadway lane 175 and adjust vehicle subsystems 165 based on the roadway lane 175. Thus, the processor 150 may be programmed to detect a lane change of the host vehicle 100 based on the sound 190 from the impact between the tire 110 of the host vehicle 100 and the set of protrusions 185. That is, when the code identifying the roadway lane 175 differs from the code corresponding to the sound 190 received by the microphone 160, the processor 150 may update the roadway lane 175 of the host vehicle 100 to match the roadway lane 175 identified by the sound 190. Furthermore, the code may be asymmetric, i.e., the code may differ when read backwards, and unique, even when read backwards. For example, the code for the roadway lane 175*c* reads 1-0-0 when moving in the proper direction of traffic and 0-0-1 when moving opposite the proper direction of traffic. Since no other roadway lane 175 has the code 0-0-1, a vehicle 100 that detects the code of 0-0-1 will determine that it is moving in a roadway lane 175 in the wrong direction.

The uniqueness of each code applies whether the code is read in the direction of travel of the host vehicle 100 or opposite the direction of travel of the host vehicle. For example, if the host vehicle 100 is moving in the left roadway lane 175*c* with the code 1-0-0 and the drifts into the adjacent roadway lane 175*d* to the left, in which traffic moves in the opposite direction, the impact between the tire 110 and the protrusions 185 will generate a sound 190 that the processor may identify as 0-1-1. However, the processor 150 may be programmed to recognize that the only roadway lanes 175 where traffic move in the direction of the host vehicle 100 have codes of 0-0-1, 0-1-0, and 1-0-0, and the roadway lane 175 with the code 0-1-1 is either an error or is associated with a roadway lane 175 in a direction opposite the host vehicle 100. Alternatively, the processor 150 may be programmed to recognize that the roadway lane 175 adjacent and to the left of the 1-0-0 roadway lane 175*c* is the 1-1-0 roadway lane 175*d* when moving in the proper direction of traffic, and the code 0-1-1 indicates that the host vehicle 100 is moving in the incorrect direction in the 1-1-0 roadway lane 175*d*. Thus, the processor 150 may be programmed to move the host vehicle 100 back to the 1-0-0 lane 175*c* and into traffic moving the same direction as the host vehicle 100. The processor 150 may be further programmed to transmit a communication the target vehicle 180*b* indicating that the host vehicle 100 is traveling against the direction of traffic. The target vehicle 180*b* may then move to a different roadway lane 175 (e.g., the roadway lane 175*e*) or stop.

The host vehicle may receive a communication 195 from the target vehicles 180*a*, 180*b*. The communication 195 may include information that the processor 150 of the host vehicle 100 can use to control the vehicle subsystems 165. The communication 195 may identify a roadway lane 175 of the target vehicle 180, a direction of travel of the target vehicle 180, or both. The communication 195 may further include warnings such as a collision warning, a blind spot warning, etc. The communication 195 may be sent in accordance with a vehicle-to-vehicle (V2V) communication protocol, e.g., dedicated short range communication (DSRC), or another wireless communication protocol such as Bluetooth®, Wi-Fi, etc. The communication 195 from the target vehicle 180*a* may indicate that the target vehicle 180*a* may be in the lane 175*a*.

The roadway 170 may include a set of protrusions 200 between the roadway lanes 175. The set of protrusions 200 between the roadway lanes 175 produce a sound 190 different from the set of protrusions 185 in the roadway lanes 175, and the processor 150 identifies the sound 190 produced by the set of protrusions 200 between the roadway lanes 175 and determines that the host vehicle 100 is performing a lane change. The set of protrusions 200 may include a different number of protrusions 200 than the number of protrusions 185 to differentiate the sound 190 identifying the current roadway lane 175 from the sound 190 identifying a lane change. That is, the set of protrusions 200 between the roadway lanes 175 may include five protrusions 200 to differentiate the sound 190 from the sound 190 produced by the set of protrusions 185 in the roadway lane 175, which is generated from either three protrusions 185 or six protrusions 185. The processor 150 may be programmed to recognize the different sounds from the protrusions 185 and the protrusions 200. The example of FIG. 3 shows the five protrusions 200 disposed over one of the lane dividers in the roadway lanes 175, and the roadway 170 may include the five protrusions 200 over a plurality of lane dividers between the roadway lanes 175.

The processor 150 may be programmed to identify a lane change of the host vehicle 100 from the current roadway lane 175 to the adjacent roadway lane 175 based on the sound 190 from the impact between the tire 110 of the host vehicle 100 and the set of protrusions 200 between the roadway lanes 175. For example, if the host vehicle 100 is in the 0-0-1 lane 175*a* and then receives the sound 190 from the protrusions 200 between the roadway lanes 175, the processor 150 may be programmed to identify that the roadway lane 175 of the host vehicle 100 is now 0-1-0, i.e., the roadway lane 175*b*. The processor 150 may be programmed to confirm the lane change upon receiving a sound 190 from the impact between the vehicle tire 110 and the next set of protrusions 185, indicating the current roadway lane 175 and to detect errors in the identification of the roadway lane 175. That is, if processor 150 identifies the current roadway lane 175 as the roadway lane 175*b* based on the protrusions 200, and the processor 150 receives a sound 190 indicating that the current roadway lane 175 is the roadway lane 175*a*, the processor 150 may be programmed to trigger a fault. Additionally or alternatively, if the processor 150 receives a sound 190 from the protrusions 200 but the host vehicle 100 stays in the current roadway lane 175 (e.g., the host vehicle 100 prematurely ends the lane change and returns to the original roadway lane 175), the processor 150 may be programmed to trigger a fault. The protrusions 200 may be spaced along the lane markers so that the host vehicle 100 can travel in the roadway lane 175 without impacting the protrusions 200. Furthermore, the protrusions 200 may be placed on lane markers that are a predetermined distance from the protrusions 185, e.g., 5 meters, so that the host vehicle 100 does not impact both the protrusions 185 in the roadway lane 175 and the protrusions 200 between the roadway lanes 175. Alternatively, the roadway 170 may include a radio frequency identification (RFID) between the roadway lanes 175, and the processor 150 may be programmed to determine that the host vehicle 100 has changed roadway lanes 175 upon receipt of a signal from the RFID.

Figure 4:
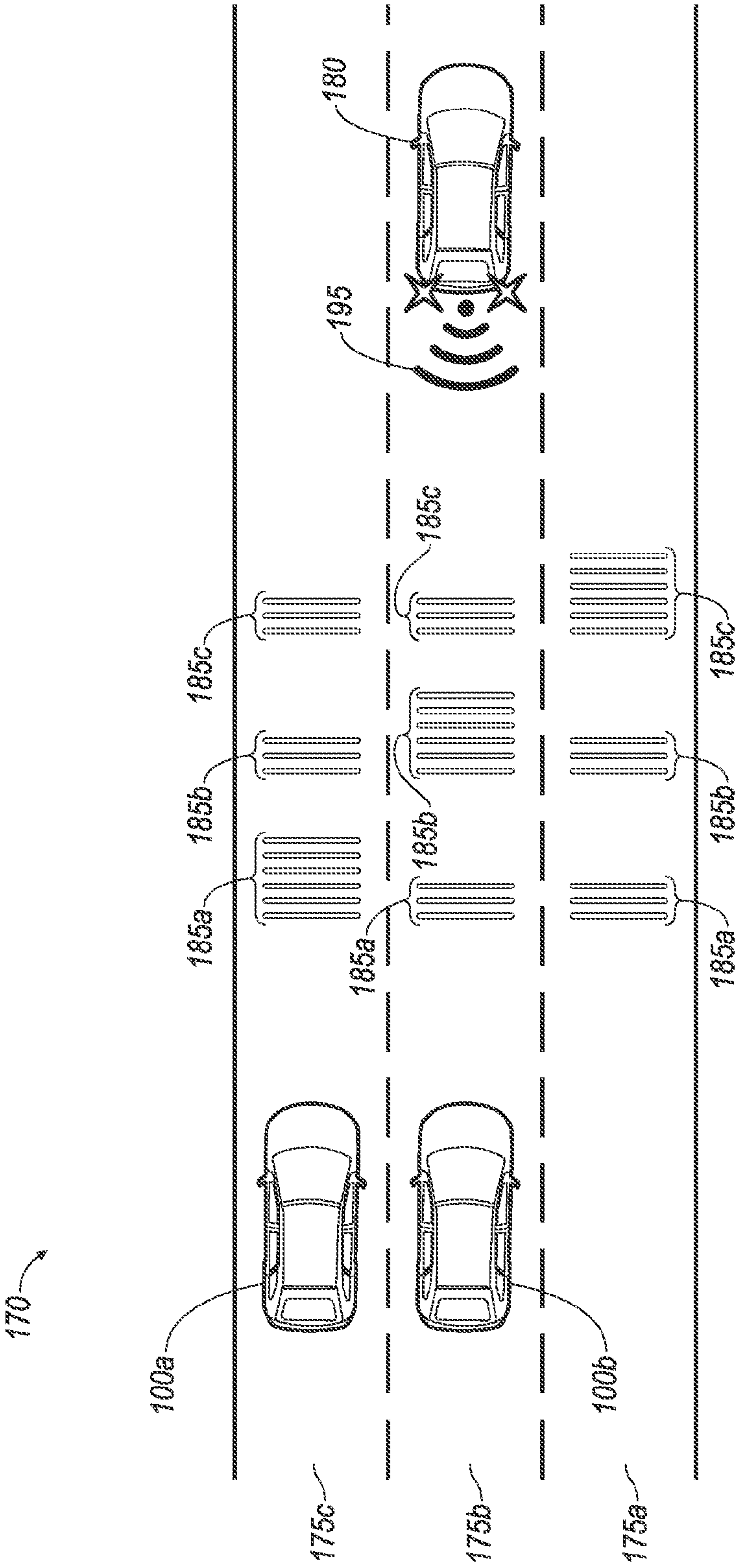
FIG. 4 illustrates an example scenario where a target vehicle broadcasts an emergency electronic brake lights warning to multiple other vehicles.

FIG. 4 illustrates the host vehicle 100 receiving a communication 195 regarding a stopped target vehicle 180 in a roadway lane 175, here, the roadway lane 175*b*. When a target vehicle 180 has malfunctioned and is stopped in a roadway lane 175*b*, e.g., the target vehicle 180 has a flat tire, the target vehicle 180 has a broken engine, etc., the target vehicle 180 may send a communication 195 to nearby vehicles 100, indicating that the target vehicle 180 has stopped in the roadway 170. The communication 195 may be an emergency brake lights warning indicating that the target vehicle 180 has malfunctioned and stopped in the roadway lane 175*b*. FIG. 4 illustrates several vehicles, including a first host vehicle 100*a* in the adjacent roadway lane 175*c* as the target vehicle 180 and a second host vehicle 100*b* in the same roadway lane 175*b* as the target vehicle 180. If the host vehicle 100 is in the same roadway lane 175 as the target vehicle 180 sending the emergency brake lights warning, i.e., the host vehicle 100*b*, the processor 150 may receive the communication 195 and adjust one of the vehicle subsystems 165 according to the warning.

For example, the processor 150 of the host vehicle 100*b* may actuate the brake subsystem to stop the host vehicle 100*b*, or the processor 150 may actuate the steering subsystem to perform a lane change into one of the roadway lanes 175*a*, 175*c* adjacent to the roadway lane 175*b* of the target vehicle 180. However, if the host vehicle 100*a* is in the roadway lane 175*c* adjacent to the roadway lane 175*b* of the host vehicle 100*b*, then the processor 150 may be programmed to ignore the warning because the host vehicle 100*a* will pass the stopped target vehicle 180. Thus, depending on the roadway lane 175*a*, 175*b*, 175*c* of the host vehicle 100*a*, 100*b* and the roadway lane 175*b* of the target vehicle 180, the processor 150 of the respective host vehicle 100*a*, 100*b* may selectively ignore the communication 195 or control the vehicle subsystems 165 according to the communication 195. Furthermore, while both host vehicles 100*a*, 100*b* are moving in the same direction of travel as the target vehicle 180, because the collision warning is intended only for the host vehicle 100*b* behind the target vehicle 180, the processor 150 may be programmed to compare the direction of travel of the target vehicle 180 to the direction of travel of the host vehicle 100 and ignore the communication 195 from the target vehicle 180 when the direction of travel of the target vehicle 180 differs from the direction of travel of the host vehicle 100.

Figure 5:
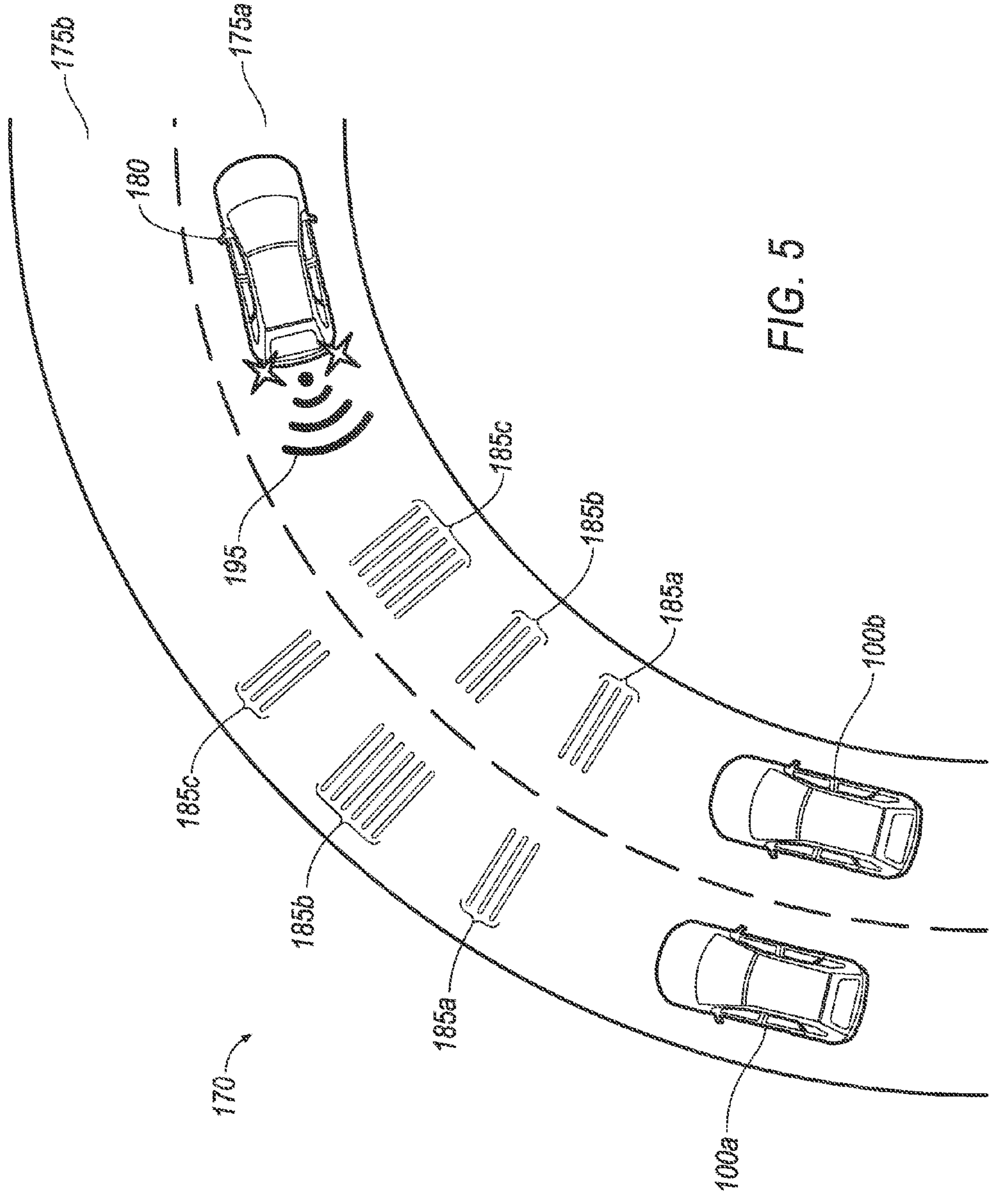
FIG. 5 illustrates an example scenario where a target vehicle broadcasts a collision warning to multiple other vehicles.

FIG. 5 illustrates the host vehicle 100 receiving a collision warning from a target vehicle 180. As described above in FIG. 4, the target vehicle 180 may send a communication 195 indicating the roadway lane 175*a* of the target vehicle 180 and a collision warning. The collision warning indicates that the target vehicle 180 has slowed or stopped in the roadway lane 175*a* but has not malfunctioned. For example, the target vehicle 180 may have suddenly stopped in traffic and sends the collision warning to warn vehicles 100 behind the target vehicle 180, including the first host vehicle 100*a* and the second host vehicle 100*b*, to slow or stop before colliding with the target vehicle 180. If the processor 150 determines that the roadway lane 175 of the host vehicle 100*b* is the same as the roadway lane 175 of the target vehicle 180, then the processor 150 may be programmed to trigger a forward collision warning and actuate one or more vehicle subsystems 165 to prevent a collision with the target vehicle 180. For example, the processor may be programmed to perform a lane change to move the host vehicle 100*b* from the roadway lane 175*a* to an adjacent roadway lane 175*b* to avoid the target vehicle 180.

However, a host vehicle 100*a* in a different roadway lane 175 (here, the roadway lane 175*b*) than the roadway lane 175*a* of the target vehicle 180, may ignore the collision warning. Thus, when the host vehicle 100*a* determines that the roadway lane 175 of the host vehicle 100*a* is different from the roadway lane 175*b* of the target vehicle 180, the processor 150 may be programmed to ignore the communication 195 with the collision warning. That is, the processor 150 may be programmed to ignore the communication 195 from the target vehicle 180 when the direction of travel of the target vehicle 180 is the same as a direction of travel of the host vehicle 100 and the roadway lane 175*a* of the target vehicle 180 differs from the roadway lane 175*b* of the host vehicle 100.

Figure 6:
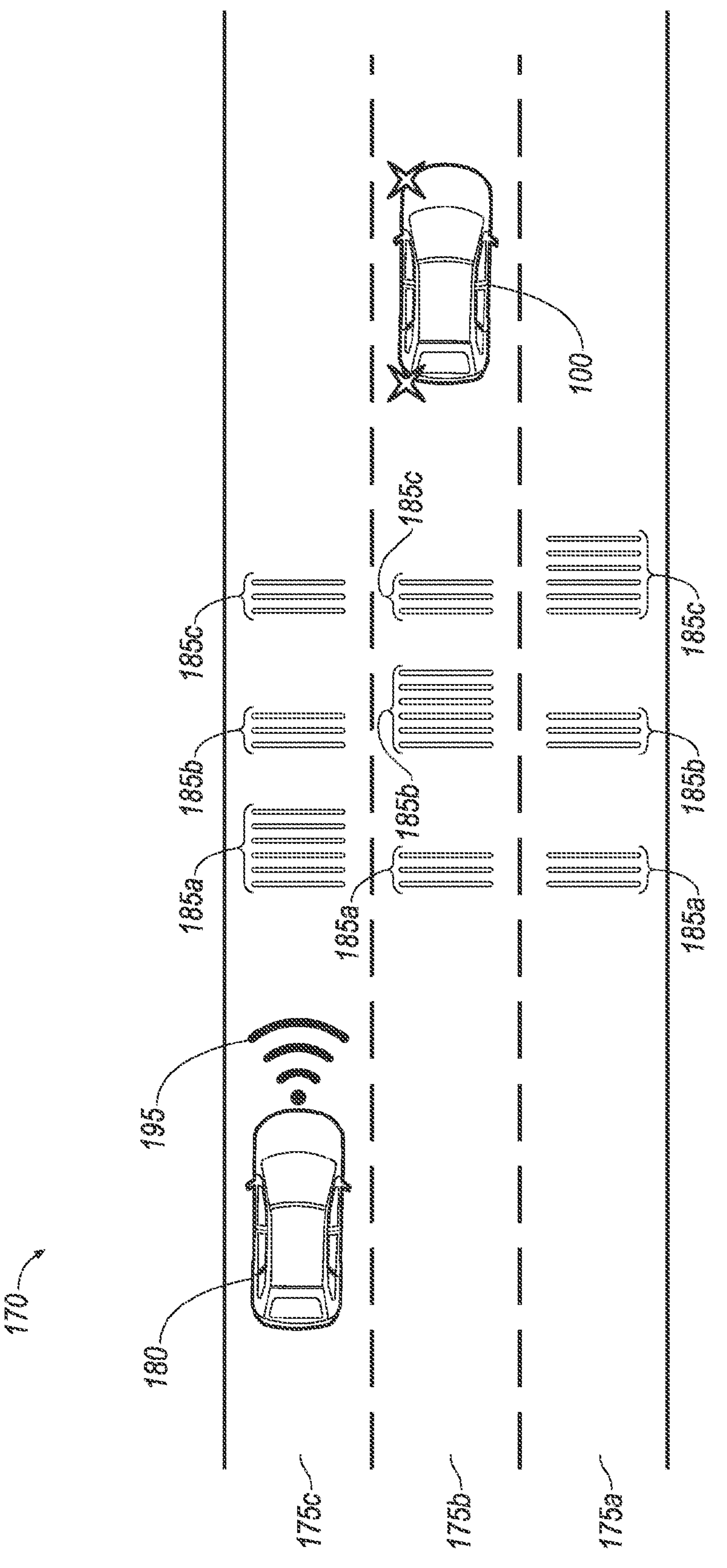
FIG. 6 illustrates an example scenario where a target vehicle broadcasts a warning indicating that the target vehicle is in a blind spot of the host vehicle of FIG. 1.

FIG. 6 illustrates the host vehicle 100 receiving a warning from a target vehicle 180 indicating that the target vehicle 180 is in a blind spot of the host vehicle 100 when the host vehicle 100 is about to perform a lane change. Here, the host vehicle 100 is about to perform a lane change, i.e., move from the roadway lane 175*b* to the adjacent roadway lane 175*c*. When the operator of the host vehicle 100 actuates the turn signal to indicate that the host vehicle 100 is about to perform the lane change, the processor 150 may receive a communication 195 from a target vehicle 180 indicating that the target vehicle 180 is in a blind spot of the host vehicle 100. The blind spot is an area on a side of the host vehicle 100 out of view of the vehicle mirror, e.g., a rear quarter blind spot. The warning indicates that the target vehicle 180 may collide with the host vehicle 100 if the host vehicle 100 completes the lane change.

As shown in FIG. 6, the lane change would move the host vehicle 100 into the roadway lane 175*c* of the target vehicle 180, and the processor 150 of the host vehicle 100 may be programmed to control one or more of the vehicle subsystems 165 to avoid the target vehicle 180. That is, the processor 150 may be programmed to control the vehicle subsystems 165 in accordance with the communication 195 if the roadway lane 175*b* of the host vehicle 100 is adjacent to the roadway lane 175*c* of the target vehicle 180. For example, the processor 150 may be programmed to actuate the steering subsystem and the brake subsystem to slow the host vehicle 100 and prevent the host vehicle 100 from turning into the adjacent roadway lane 175*c* until the target vehicle 180 passes the host vehicle 100. The processor 150 of the host vehicle 100 may be programmed to use the lane identification in conjunction with a sensor that detect the target vehicle 180 in the blind spot to confirm that the target vehicle 180 is present in the blind spot. If the target vehicle 180 is not in an adjacent roadway lane 175*c* relative to the roadway lane 175*b* of the host vehicle 100, the processor 150 may be programmed to ignore the warning. Alternatively, if the lane change would move the host vehicle 100 to a roadway lane 175 that is not the roadway lane 175*c* of the target vehicle 180, e.g., the roadway lane 175*a*, the processor 150 may be programmed to ignore the warning.

Figure 7:
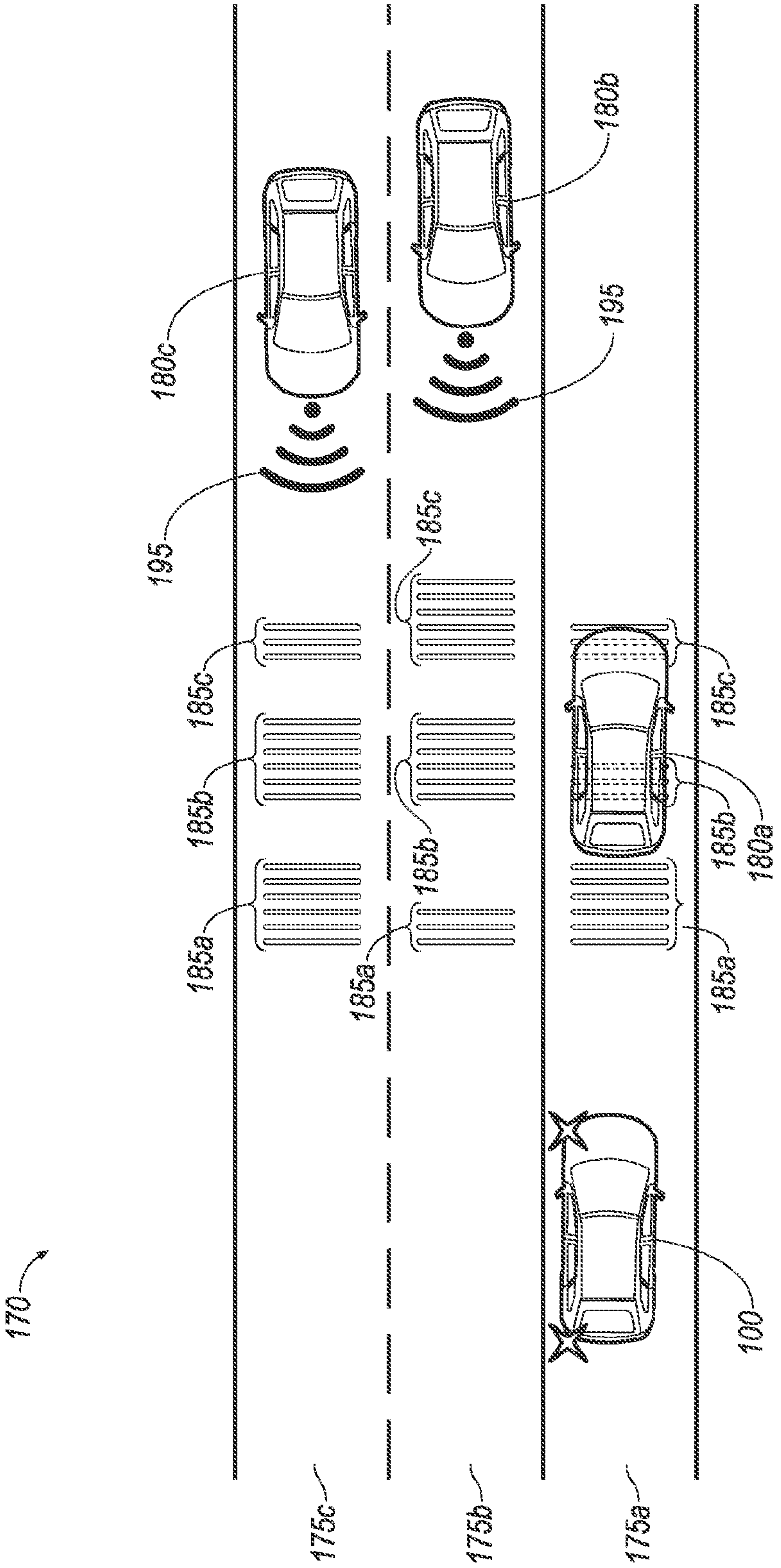
FIG. 7 illustrates an example scenario where a target vehicle broadcasts a collision warning to the host vehicle of FIG. 1.

FIG. 7 illustrates the host vehicle 100 about to pass a target vehicle 180*a* and receiving communications 195 from a plurality of target vehicles 180*b*, 180*c*. Here, the operator of the host vehicle 100 may want to pass the target vehicle 180*a* in front of the host vehicle 100 by performing a lane change into an adjacent roadway lane 175*b* where traffic flows opposite the direction of the host vehicle 100. If a target vehicle 180 is moving in a direction of travel opposite the direction of travel of the host vehicle 100, e.g., the target vehicles 180*b*, 180*c*, the host vehicle 100 may collide with the target vehicle 180. Thus, the processor 150 may be programmed to prevent the host vehicle 100 from moving into the adjacent roadway lane 175_b_ to pass the target vehicle 180_a_ in front of the host vehicle 100 based on the communications 195.

The example of FIG. 7 shows two additional target vehicles 180_b_, 180_c_ in adjacent roadway lanes 175_b_, 175_c_ moving in a direction opposite to the host vehicle 100. A target vehicle 180_b_ is in the roadway lane 175_b_ adjacent to the roadway lane 175_a_ of the host vehicle 100 and a target vehicle 180_c_ is one further roadway lane 175_c_ away from the host vehicle 100. The target vehicles 180_b_, 180_c_ send communications 195 including the respective roadway lanes 175_b_, 175_c_ of the first and second target vehicles 180_b_, 180_c_. The processor 150 may be programmed to compare the roadway lane 175_a_ of the host vehicle 100 to the roadway lanes 175_b_, 175_c_ of the target vehicles 180_b_, 180_c_ and to the roadway lane 175_b_ that the host vehicle 100 will enter when passing the target vehicle 180_a_ in front of the host vehicle 100. Because the target vehicle 180_c_ is not in the roadway lane 175_b_ that the host vehicle 100 would move into in order to pass the target vehicle 180_a_, the host vehicle 100 is only at risk of colliding with the target vehicle 180_b_ that is in the roadway lane 175_b_. Thus, the processor 150 may be programmed to ignore the communication 195 from the target vehicle 180_c_ and to control one or more subsystems 165 according to the communication 195 from the target vehicle 180_b_.

Figure 8:
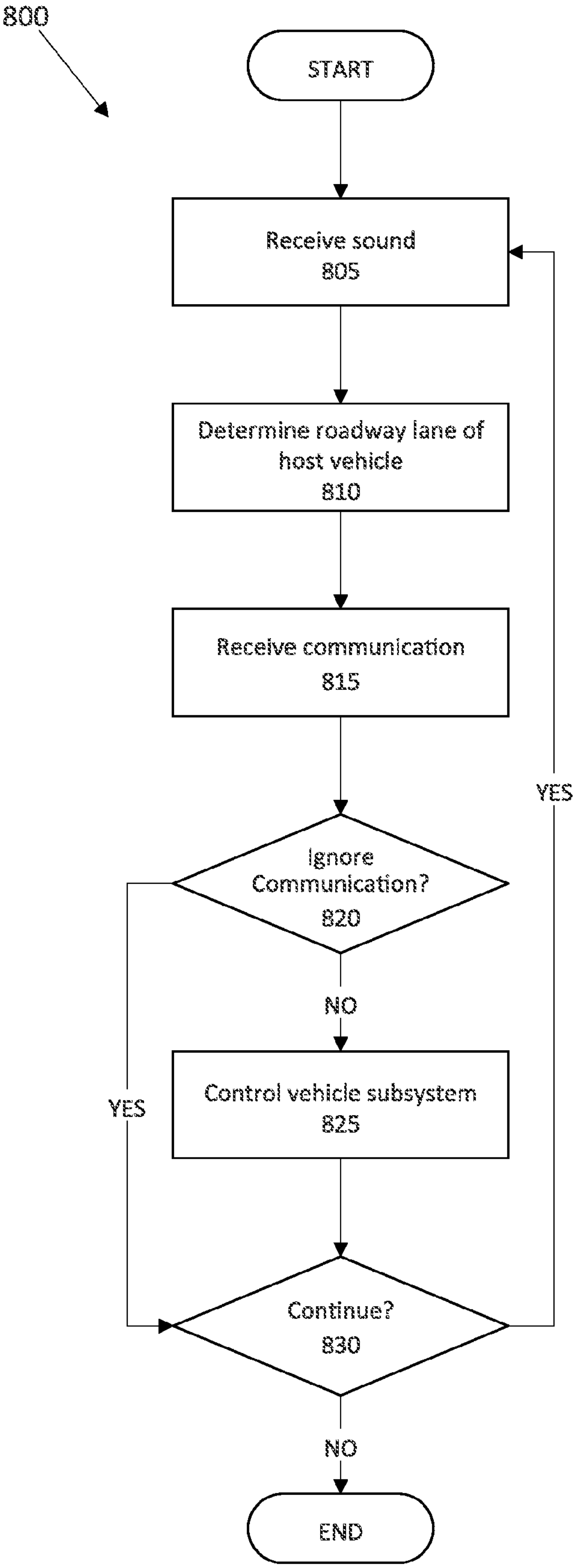
FIG. 8 illustrates a flow chart of an example process executed by the lane detection system incorporated into the host vehicle of FIG. 1.

FIG. 8 illustrates a process 800 for controlling the vehicle subsystems 165 according to the roadway lane 175 of the target vehicle 180. The process 800 begins in a block 805, where the microphone 160 receives the sound 190 of the impact between the host vehicle tire 110 and the protrusions 185. As described above, the sound 190 has three portions of differing lengths based on the roadway lane 175.

In a block 810, the processor 150 determines the roadway lane 175 of the host vehicle 100. Based on the sound 190 received by the microphone 160, the processor 150 may be programmed to identify the roadway lane 175 of the host vehicle 100. As described above, the sound 190 may include three portions, and the length of each portion may be assigned a binary value. The processor 150 may identify the combination of the binary values and determine the roadway lane 175 of the host vehicle 100. For example, if the identifying codes from the sound 190 are 0-0-1, then the processor 150 may be programmed to identify the roadway lane 175 of the host vehicle 100 as a right roadway lane 175_a_ as shown in FIG. 3.

In a block 815, the processor 150 receives a communication 195 from a target vehicle 180. As described above, the communication 195 may include the roadway lane 175 of the target vehicle 180 and a warning that may require the host vehicle 100 to control one of the vehicle subsystems 165. The processor 150 may receive the communication 195 and compare the roadway lane 175 of the target vehicle 180 to the roadway lane 175 of the host vehicle 100. For example, if the roadway lane 175 of the host vehicle is 0-0-1, i.e., the roadway lane 175_a_ as described above and shown in FIG. 3, and the roadway lane 175 of the target vehicle is 0-1-0, i.e., the roadway lane 175_b_ as shown in FIG. 3, then the processor 150 may determine that the target vehicle 180 is in the roadway lane 175 adjacent to the left of the roadway lane 175 of the host vehicle 100. That is, the roadway lane 175 of the host vehicle 100 is different from the roadway lane 175 of the target vehicle 180. Based on the warning in the communication 195, the processor 150 may be programmed to control the vehicle subsystems 165.

In a block 820, the processor 150 determines whether to ignore the communication 195. As described above, the processor 150 may be programmed to ignore the communication 195 when the host vehicle 100 is not at risk of colliding with the target vehicle 180. For example, if the target vehicle 180 is in an adjacent roadway lane 175 to the roadway lane 175 of the host vehicle 100 and the target vehicle 180 is stopped, the processor 150 may be programmed to ignore the communication 195 because the host vehicle 100 will not collide with the target vehicle 180 if the host vehicle 100 remains in the roadway lane. In another example, the processor 150 may be programmed to accept the communication 195 when the target vehicle 180 and the host vehicle 100 are in the same roadway lane 175 and the communication 195 indicates that the target vehicle 180 is stopped in the roadway lane 175. If the processor 150 determines to ignore the communication, the process 800 continues in a block 830. Otherwise, the process 800 continues in a block 825.

In the block 825, the processor 150 adjusts the vehicle subsystems 165 according to the communication 195. The warning in the communication 195 and the roadway lane 175 of the target vehicle 180 determines which of the vehicle subsystems 165 the processor controls, if any. For example, if the warning indicates that the target vehicle 180 is in a blind spot of the host vehicle 100 and the host vehicle 100 is about to perform a lane change into the roadway lane 175 of the target vehicle 180, then the processor 150 may adjust the propulsion subsystem to slow the host vehicle 100 until the target vehicle passes the host vehicle 100 and then complete the lane change.

In the block 830, the processor 150 determines whether to continue the process 800. For example, if the host vehicle 100 has reached a destination and a transmission is in a "parked" mode, then the processor 150 may determine not to continue the process 800. In another example, if the processor 150 determines that the roadway 170 does not include any protrusions 185, e.g., the processor 150 does not receive a sound 190 for a predetermined period of time, then the processor 150 may determine not to continue the process 800. If the processor 150 determines to continue, the process 800 returns to the block 805 to receive a sound 190 from the impact between the vehicle tire 110 and the set of protrusions 185 in the roadway lane 175. Otherwise, the process 800 ends.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims. It is intended that future developments will occur in the technologies discussed herein, and that the disclosed systems and methods will be incorporated into such future embodiments. In sum, it should be understood that the application is capable of modification and variation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system, comprising a processor and a memory storing instructions executable by the processor, the instructions including:

determining a roadway lane and a direction of travel of a host vehicle based on a sound from an impact between a tire of the host vehicle and a set of protrusions in a roadway;

receiving a communication from a target vehicle, the communication identifying a roadway lane and a direction of travel of the target vehicle and including a warning;

comparing the roadway lane of the host vehicle to the roadway lane of the target vehicle and comparing the direction of travel of the host vehicle to the direction of travel of the target vehicle;

ignoring the communication when the warning is a first type of warning and the roadway lane of the host vehicle is the same as the roadway lane of the target vehicle;

controlling a vehicle subsystem in accordance with the communication and the warning when the warning is a second type of warning and the roadway lane of the host vehicle is the same as the roadway lane of the target vehicle; and ignoring the communication when the warning is a third type of warning and the direction of travel of the host vehicle is different from the direction of travel of the target vehicle.

2. The system of claim 1, wherein the set of protrusions in the roadway lane of the host vehicle includes a different number of protrusions than a set of protrusions in the roadway lane of the target vehicle.

3. The system of claim 1, wherein the sound from the impact between the tire of the host vehicle and the set of protrusions in the roadway lane of the host vehicle is different from a sound from an impact between a tire of the target vehicle and a set of protrusions in the roadway lane of the target vehicle.

4. The system of claim 1, wherein the instructions further include ignoring the communication from the target vehicle if the roadway lane of the target vehicle differs from the roadway lane of the host vehicle.

5. The system of claim 1, wherein the instructions further include controlling the vehicle subsystem in accordance with the communication if the roadway lane of the host vehicle is adjacent to the roadway lane of the target vehicle.

6. The system of claim 1, wherein the instructions further include ignoring the communication from the target vehicle when the direction of travel of the target vehicle differs from the direction of travel of the host vehicle and the roadway lane of the target vehicle differs from the roadway lane of the host vehicle.

7. The system of claim 1, wherein the instructions further include ignoring the communication from the target vehicle when the direction of travel of the target vehicle is the same as the direction of travel of the host vehicle and the roadway lane of the target vehicle differs from the roadway lane of the host vehicle.

8. The system of claim 1, wherein the instructions further include detecting a lane change of the host vehicle based on the sound from the impact between the tire of the host vehicle and the set of protrusions.

9. The system of claim 1, wherein the communication indicates that the target vehicle has stopped in the roadway lane of the host vehicle and wherein controlling the vehicle subsystem includes controlling the vehicle subsystem to move the host vehicle to an adjacent roadway lane.

10. A method, comprising:

determining a roadway lane and a direction of travel of a host vehicle based on a sound from an impact between a tire of the host vehicle and a set of protrusions in a roadway;

receiving a communication from a target vehicle, the communication identifying a roadway lane and a direction of travel of the target vehicle and including a warning;

comparing the roadway lane of the host vehicle to the roadway lane of the target vehicle and comparing the direction of travel of the host vehicle to the direction of travel of the target vehicle;

ignoring the communication when the warning is a first type of warning and the roadway lane of the host vehicle is the same as the roadway lane of the target vehicle;

controlling a vehicle subsystem in accordance with the communication and the warning when the warning is a second type of warning and the roadway lane of the host vehicle is the same as the roadway lane of the target vehicle; and ignoring the communication when the warning is a third type of warning and the direction of travel of the host vehicle is different from the direction of travel of the target vehicle.

11. The method of claim 10, wherein the set of protrusions in the roadway lane of the host vehicle includes a different number of protrusions than a set of protrusions in the roadway lane of the target vehicle.

12. The method of claim 10, wherein the sound from the impact between the tire of the host vehicle and the set of protrusions in the roadway lane of the host vehicle is different from a sound from an impact between a tire of the target vehicle and a set of protrusions in the roadway lane of the target vehicle.

13. The method of claim 10, further comprising ignoring the communication from the target vehicle if the roadway lane of the target vehicle differs from the roadway lane of the host vehicle.

14. The method of claim 10, further comprising controlling the vehicle subsystem in accordance with the communication if the roadway lane of the host vehicle is adjacent to the roadway lane of the target vehicle.

15. The method of claim 10, wherein the method further comprises ignoring the communication from the target vehicle when the direction of travel of the target vehicle differs from the direction of travel of the host vehicle and the roadway lane of the target vehicle differs from the roadway lane of the host vehicle.

16. The method of claim 10, wherein the method further comprises ignoring the communication from the target vehicle when the direction of travel of the target vehicle is the same as the direction of travel of the host vehicle and the roadway lane of the target vehicle differs from the roadway lane of the host vehicle.

17. The method of claim 10, further comprising detecting a lane change of the host vehicle based on the sound from the impact between the tire of the host vehicle and the set of protrusions.

18. The method of claim 10, wherein the communication indicates that the target vehicle has stopped in the roadway lane of the host vehicle and wherein controlling the vehicle subsystem includes controlling the vehicle subsystem to move the host vehicle to an adjacent roadway lane.

19. A method, comprising:

determining a roadway lane and a direction of travel of a host vehicle based on a sound from an impact between a tire of the host vehicle and a set of protrusions in a roadway;

receiving a first communication from a first target vehicle, the first communication identifying a roadway lane and a direction of travel of the first target vehicle and including a first warning;

receiving a second communication from a second target vehicle, the second communication identifying a roadway lane and a direction of travel of the second target vehicle and including a second warning;

comparing the roadway lane of the host vehicle to the roadway lanes of the first and second target vehicles;

comparing the direction of travel of the host vehicle to the direction of travel of the first target vehicle;

based at least in part on the first warning, ignoring the first communication when the roadway lane of the host vehicle is the same as the roadway lane of the first target vehicle;

based at least in part on the first warning, ignoring the first communication when the direction of travel of the host vehicle differs from the direction of travel of the first target vehicle; and based at least in part on the second warning, controlling a vehicle subsystem in accordance with the second communication and the second warning when the roadway lane of the host vehicle is the same as the roadway lane of the second target vehicle.

* * * * *